UNITED STATES PATENT OFFICE.

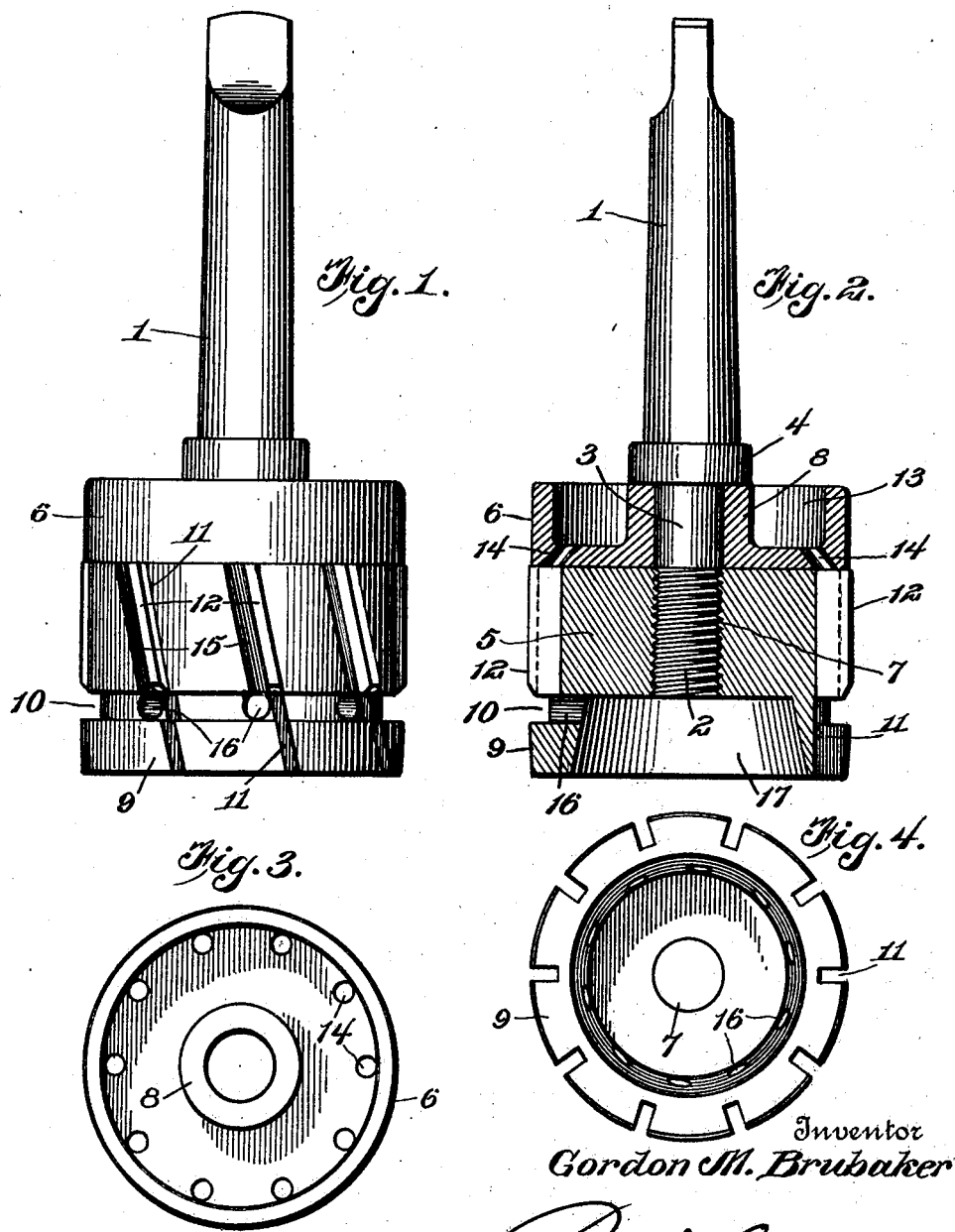

GORDON MARK BRUBAKER, OF MILLERSBURG, PENNSYLVANIA.

CYLINDER-BORING REAMER.

1,400,021.

Specification of Letters Patent. Patented Dec. 13, 1921.

Application filed April 10, 1920. Serial No. 372,846.

*To all whom it may concern:*

Be it known that I, GORDON MARK BRUBAKER, a citizen of the United States, residing at Millersburg, in the county of Dauphin and State of Pennsylvania, have invented new and useful Improvements in Cylinder-Boring Reamers, of which the following is a specification.

This invention relates to improvements in cylinder boring reamers, and one object of the invention is to provide a fast boring reamer having means for efficiently lubricating the cutting blades and also the walls of the surface being bored, whereby cast iron cylinders may be rapidly bored with a degree of smoothness not possible with other types of reamers.

Another object of the invention is to provide a reamer which admits of the more convenient resharpening of the cutters, ready and efficient clearance of the chips, and supply of oil to the cutters and cylinder surfaces for an easy and smooth cutting action.

The invention consists of the features of construction, combination and arrangement of parts, hereinafter fully described and claimed, reference being had to the accompanying drawing, in which:—

Figure 1 is a side elevation of a reamer embodying my invention.

Fig. 2 is a vertical transverse section of the same.

Fig. 3 is a top plan view of the collar or top member of the reamer.

Fig. 4 is a bottom plan view of the body portion or head of the reamer.

Referring to the drawing, 1 designates a tool shank, preferably of Morse taper type, said shank having a reduced tool carrying extremity formed to provide a lower threaded portion 2 and an upper smooth cylindrical portion 3, the latter being surmounted by a flange or shoulder 4 formed upon the base of the shank body proper.

Detachably secured upon the tool supporting portion of the shank is a tool comprising parts 5 and 6, the part 5 consisting of a reamer head having a threaded bore 7 to receive and engage the part 2 of the shank, and the part 6 consisting of a collar having a central hub 8 which snugly embraces the shank portion 3, said collar being clamped between the reamer head 5 and the annular shoulder 4 of the shank body. The collar 6 serves as a detachable crown element for the reamer, which crown element provides for the more ready removal of the cutting blades of the reamer when occasion requires and also serves as a lubricant reservoir, as hereinafter described.

The head 5 is formed with a pilot portion 9, and disposed between this pilot portion and the adjacent portion of the body of the reamer head is an annular groove 10. The outer face of the body of the reamer is formed with angularly arranged (diagonal) grooves 11 forming seats to receive the correspondingly arranged cutter blades 12, and these grooves 11 continue outwardly through the wall of the groove 10 and the pilot portion 9, so as to provide for the ready and convenient insertion and removal of the blades, the clearance of chips and the flow of lubricant to the surfaces to be lubricated. The cutting blades 12 have their upper or outer end edges arranged to abut against the bottom of the collar 6, and it will be understood that whenever it is necessary to remove the blades and apply new ones the head 5 may be unscrewed from the shank, thus exposing the ends of the blades allowing the blades to be driven out of or into position.

The collar 6 comprises a base or bottom portion having the hub portion 8 extending upwardly therefrom and also having an outer wall concentric with the hub portion. This construction provides an annular chamber 13 opening through the top of the collar and which forms a lubricant reservoir. This chamber is designed to contain cotton waste or other suitable absorbent material which is saturated with the oil in sufficient quantity to allow the oil to flow by gravity therefrom to the working parts for lubrication. The oil passes from the chamber 13 outwardly through primary oil feed holes 14 formed in the base of the collar, which holes communicate with the upper ends of channels 15 formed in the periphery of the cutter body 5 and extending from the top edge thereof down to and intersecting the annular groove 10. These channels 15 receive and provide proper clearance for the ships and convey the oil to the cutters, thus facilitating the discharge of the chips while the blades are kept constantly lubricated. Formed in the wall of the grooved portion 10 are radial openings 16 which are disposed in alinement with the lower ends of the channels 15, and these openings 16 lead inwardly to a flaring chamber 17 formed in the base of the reamer head and opening through the outer end of the pilot portion 9.

It will be understood from the foregoing description that the chips passing forwardly through the channels 15 enter the groove 10 and thence pass radially through the openings 16 into the clearance channel 17 and drop through the latter down along the walls of the cylinder, thus keeping the cutters clear of chips and preventing choking of the clearance and lubricant feed channels. Oil flowing through the channels 15 also passes into the groove 10 and through radial openings 16 into the chamber 17 and discharges through said chamber and also between the periphery of the pilot portion 9 and the walls of the cylinder, thus keeping the cylinder wall lubricated in advance of the cutters and facilitating and rendering easier the feed motion of the reamer, as well as the freedom of cutting action of the cutters on the walls of the cylinder. It is difficult and practically impossible to smoothly cut the dry surfaces of cast iron cylinders for well known reasons, but by lubricating the walls in advance of the cutters this objection is largely overcome and I find that by the use of my reamer the cylinder may not only be bored very rapidly but also very smoothly. The pilot portion 9 is preferably tapered to fit the cylinder before reaming, or in other words to conform to the original diameter of the cylinder, thus insuring the proper guidance of the tool in its feed action.

The mode of assembling the parts of the device will be apparent from the foregoing description, and it will be understood that the direction of the threaded surfaces 2 and 7 may be such as to insure tightness of the clamping connection between the members 5 and 6 and their firm retention on the shank under the cutting stresses and strains, while at the same time by revolving the part 5 in the proper direction the elements of the device may be readily and conveniently disassembled and thereafter assembled for use. In practice suitable means may be provided for supplying oil continuously to the chamber 13, so that during the operation of the reamer a slow flow of oil through each opening 14 drop by drop or in a constant stream, according to the fluidity of the oil may be secured to provide for the proper lubrication of the blades and the cylinder walls in the operation of the reamer as circumstances may require.

Having thus fully described my invention, I claim:

1. A reamer comprising a head having a clearance chamber opening through its forward portion, and provided with an annular series of longitudinally extending blades having their forward ends terminating in rear of said clearance chamber, and longitudinal oil grooves extending alongside said blades, said head further having channels leading from the forward ends of said grooves into said clearance chamber.

2. A reamer comprising a reamer head having a body portion and a pilot portion, said parts being peripherally spaced by an annular groove, said body portion being provided with cutting blades and longitudinal channels extending alongside said blades, and said pilot portion having a clearance chamber and radial openings arranged in alinement with said channels and extending from the groove to said clearance chamber.

3. A reamer comprising a shank, a reamer head mounted on the shank and provided with a body portion and a pilot portion, an annular groove being formed in the periphery of the reamer between said portions, cutter blades mounted upon the body portion of the reamer, said body portion being provided with channels extending from its upper edge to said groove, and said pilot portion having a clearance chamber opening through its outer end and radial openings extending between said groove and chamber, and a collar mounted upon the shank and having a lubricant reservoir provided with outlets communicating with said channels.

4. A reamer comprising a shank, a reamer head mounted upon the shank, cutter blades carried by the reamer head, a collar upon the shank above the reamer head provided with an oil reservoir having outlets therefrom, said reamer head being provided with channels communicating with said openings and extending along the blades and to a point in advance thereof, and said reamer head having an open-front annular pilot portion arranged in advance of the blades and radial openings between the forward ends of the blades and the interior of said pilot portion.

5. A reamer comprising a shank, a head fitted upon the shank and comprising a body portion and a pilot portion, said portions being separated by an external annular groove, said body portion being provided with blade receiving seats and oil channels extending alongside the same and communicating with said groove, and said pilot portion being provided with an internal clearance chamber and slots in alinement with said seats for the insertion and removal of the blades, said head also having radial openings extending between the annular groove and the clearance chamber, and a collar fitted upon the shank and having a lubricant reservoir and openings leading therefrom and communicating with said oil channels.

In testimony whereof I affix my signature.

GORDON MARK BRUBAKER.